United States Patent [19]

Lentz

[11] 3,868,866
[45] Mar. 4, 1975

[54] TRANSMISSION CONTROL SYSTEM
[75] Inventor: Carl A. Lentz, Mooresville, Ind.
[73] Assignee: General Motors Corporation, Detroit, Mich.
[22] Filed: Sept. 10, 1973
[21] Appl. No.: 395,621

[52] U.S. Cl. .............................. 74/752 C, 74/867
[51] Int. Cl. ............................................. F16h 3/74
[58] Field of Search.......... 74/752 C, 866, 867, 868, 74/869, 753

[56] References Cited
UNITED STATES PATENTS
3,688,607  9/1972  Marlow .............................. 74/866

Primary Examiner—Samuel Scott
Assistant Examiner—Frank H. McKenzie, Jr.
Attorney, Agent, or Firm—Donald F. Scherer

[57] ABSTRACT

A valving system for controlling the engagement and disengagement of the fluid operated drive establishing devices of a multi-speed planetary transmission. Each drive establishing device is controlled by a separate shift valve. Relay valves control fluid flow to the shift valves such that when a drive establishing device is engaged by a shift valve-relay valve combination, fluid pressure is directed to the remaining relay valve to prevent the distribution of pressure to their respective shift valves. In the event that a shift valve does not respond properly to the shift signals, the relay valves operate to prevent loss of the drive connection in the transmission.

4 Claims, 3 Drawing Figures

TRANSMISSION CONTROL SYSTEM

This invention relates to transmission controls and more particularly to transmission controls providing control interlocks to sustain a drive connection when an offgoing or oncoming shift valve does not function properly.

It is an object of the invention to provide an improved transmission control having solenoid control shift valves and hydraulically operated relay valves for controlling the engagement of drive establishing devices and fluid passage means interconnecting the shift and relay valves such that a drive ratio is maintained in a transmission when an oncoming or offgoing shift valve does not function properly.

It is another object of this invention to provide an improved transmission control for controlling the establishment of a low, intermediate, and high drive ratio in a transmission, and wherein the control includes shift valves and relay valves being hydraulically interconnected such that when an intermediate drive ratio is established, a drive ratio change will not occur unless both the offgoing and oncoming shift valves function properly.

These and other objects of the present invention will be more apparent from the following description and drawings wherein.

Figures 1, 2A:
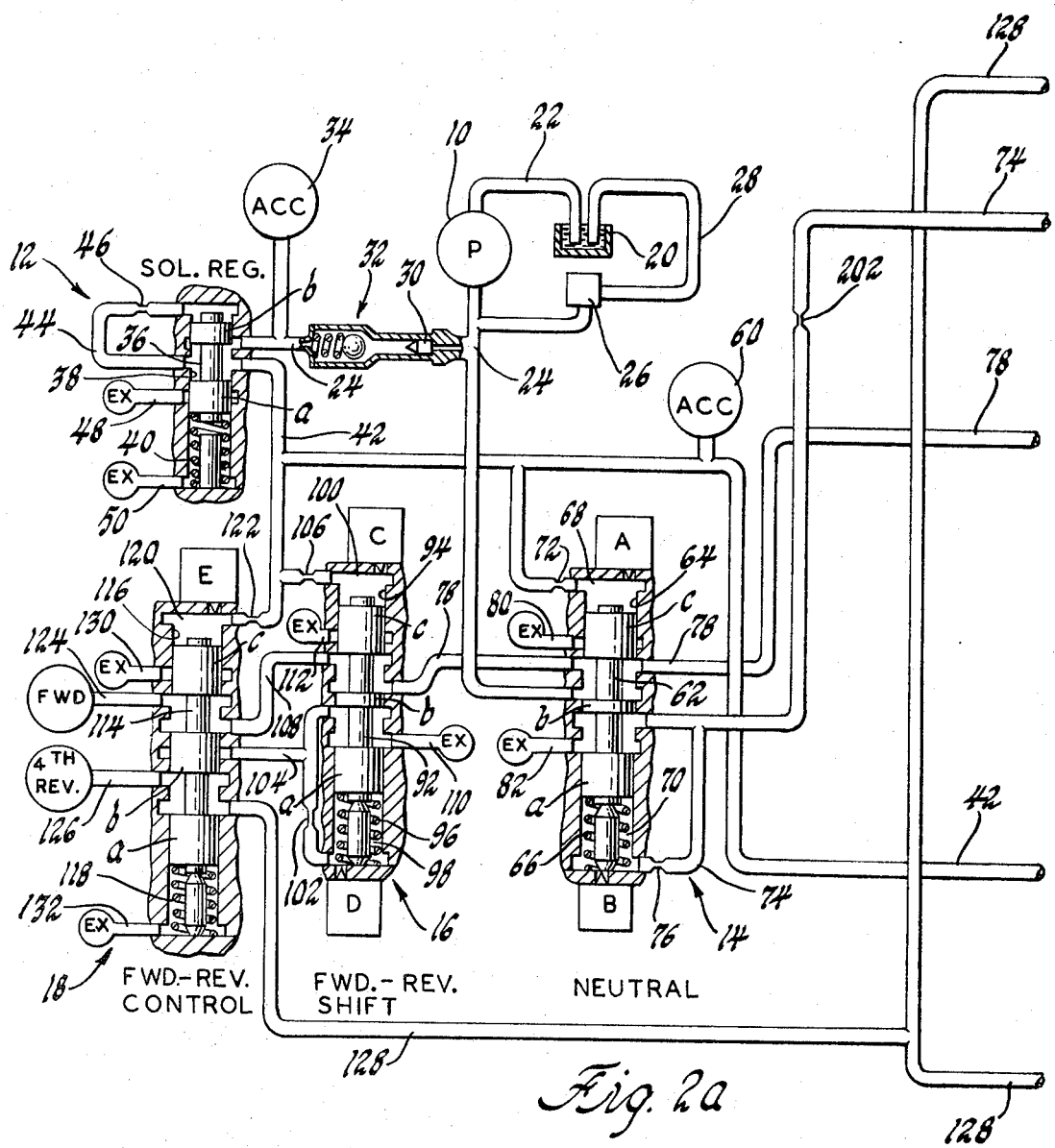
FIG. 1 is a block diagram showing the arrangement of FIGS. 2a and 2b.
FIG. 2a is a diagrammatic representation of a portion of the control system.

Referring to the drawings, wherein like characters designate the same or corresponding parts, there is shown in FIG. 2a a conventional engine driven hydraulic pump 10, a solenoid regulator valve 12, a neutral valve 14, a forward-reverse shift valve 16, and a forward-reverse control valve 18. The pump 10 draws fluid from a reservoir 20 through an inlet passage 22 and delivers fluid under pressure to a main passage 24. Fluid pressure in the main passage 24 is controlled by a conventional pressure regulator valve 26 which directs excess fluid in passage 24 through passage 28 to the reservoir 20. Fluid pressure in passage 24 is also directed to the neutral valve 15 and through a filter 30 and one way ball check valve 32 to the solenoid regulator valve 12 and an accumulator 34.

The solenoid regulator valve 12 includes a valve spool 36 having equal diameter spaced lands $a$ and $b$ slidably disposed in a valve bore 38. The valve spool 36 is urged toward one end of valve bore 38 by a compression spring 40. The valve bore 38, in the spring set position, is in fluid communication with the main passage 24 intermediate lands $a$ and $b$, a solenoid pressure passage 42 intermediate lands $a$ and $b$, and a control passage 44 intermediate lands $a$ and $b$ and through a restriction 46 adjacent one end of valve land $b$. The valve bore 38 is also in fluid communication with a pair of exhaust passages 48 and 50. When the pump 10 is delivering fluid under pressure, the fluid pressure in passage 24 is directed between lands $a$ and $b$ to passages 42 and 44. The fluid pressure in passage 44 acts on one side of valve land $b$ to move the valve spool 36 against the spring 40, thereby causing valve land $b$ to close passage 24 and open passage 48 to limit any further increase in fluid pressure in passages 42 and 44. If the fluid pressure in passages 42 and 44 should decrease, the valve spool 36 will be moved by the spring 40 until the passage 24 is opened sufficiently to reestablish the desired pressure in passage 42. The passage 42 is in fluid communication with solenoids A, C, and E of the neutral valve 14, forward reverse shift valve 16, and forward reverse control valve 18 respectively. The passage 42 is also in fluid communication with fluid chambers adjacent solenoids F, G, H, and J of a first shift valve 52, the second shift valve 54, a third shift valve 56, and a fourth shift valve 58, respectively. An accumulator 60 is also in fluid communication with the passage 42, which accumulator functions to maintain a substantially constant fluid pressure in the passage 42.

The neutral valve 14 includes a valve spool 62 having equal diameter spaced lands $a$, $b$, and $c$ slidably disposed in a valve bore 64, and a compression spring 66 compressed between one end of valve bore 64 and valve land $a$. The valve bore 64 cooperates with valve land $c$ to provide a drive control chamber 68 and with valve land $a$ to provide a neutral control chamber 70. The drive control chamber 68 is in fluid communication through a restriction 72 with the solenoid pressure passage 42. Fluid pressure in the chamber 68 is controlled by a solenoid A, such that when solenoid A is energized, the chamber 68 is exhausted and the valve spool 62 is moved to the neutral or spring set position by the spring 70. The neutral chamber 70 is in fluid communication with a neutral control passage 74 through a restriction 76. Fluid pressure in the neutral chamber 70 is controlled by a solenoid B such that when solenoid B is energized, the chamber 70 is exhausted and at the same time, the solenoid A is deenergized and chamber 68 is pressurized whereby the valve spool 62 will move to the pressure controlled position shown. The valve bore 64 is in fluid communication with the main passage 24, the neutral passage 74, a drive passage 78, and two exhaust passages 80 and 82. In the drive or pressure controlled position shown, the main passage 24 is in fluid communication with the drive passage 78 between lands $b$ and $c$ while the neutral passage 74 is connected to exhaust passage 82 between lands $a$ and $b$. In the neutral or spring set position, main passage 24 is in fluid communication with neutral passage 74 between lands $a$ and $b$, exhaust passage 82 is blocked by land $a$, and drive passage 78 is exhausted at passage 80 between lands $b$ and $c$. The drive passage 78 is in fluid communication with the forward-reverse shift valve 16 and with a first relay valve 84, a second relay valve 86, a third relay valve 88, and a fourth relay valve 90. The neutral passage 74 is also in fluid communication with the second, third and fourth relay valves 86, 88, and 90 respectively.

The forward-reverse shift valve 16 includes a valve spool 92 having spaced equal diameter lands $a$, $b$, and $c$ slidably disposed in a valve bore 94 and a compression spring 96 compressed between one end of valve bore 94 and valve land $a$. The valve bore 94 cooperates with valve lands $a$ and $c$ to provide a reverse control chamber 98 and a forward control chamber 100, respectively. Fluid pressure in the reverse control chamber 98 is controlled by a solenoid D and fluid pressure in forward chamber 100 is controlled by the solenoid C. The reverse control chamber 98 is in fluid communication through a restriction 102 with a reverse passage 104, and the forward control chamber 100 is in fluid communication with the solenoid pressure passage 42 through a restriction 106. As described above for the neutral valve 14, the solenoids C and D function to control the fluid pressure in the chamber 100 and 98 respectively, thereby controlling the position of valve spool 92 in valve bore 94. The valve bore 94 is in fluid communication with the drive passage 78, the reverse passage 104, a forward passage 108, and two exhaust passages 110 and 112. In the forward or pressure controlled position, drive passage 78 is in fluid communication with forward passage 108 between lands $b$ and $c$, reverse passage 104 is exhausted at passage 110 between lands $a$ and $b$, and exhaust passage 112 is blocked by land $c$. In the reverse or spring set position, the drive passage 78 is in fluid communication with the reverse passage 104 between lands $a$ and $b$, the forward passage 108 is exhausted between lands $b$ and $c$ and exhaust 110 is blocked by valve land $a$.

The forward-reverse control valve 18 includes a valve spool 114 having spaced equal diameter lands $a$, $b$, and $c$ slidably disposed in a valve bore 116, and a spring 118 compressed between valve land $a$ and one end of valve bore 116. The valve bore 116 and valve land $c$ cooperate to provide a forward control chamber 120 which is in fluid communication with the solenoid pressure passage 42 through a restriction 122. Fluid pressure in the chamber 120 is controlled by solenoid E such that when the solenoid E is energized, thereby exhausting chamber 120, the spring 118 will move the valve spool 114 to the reverse or spring set position. When the solenoid E is deenergized, the chamber 120 will be pressurized thereby moving the valve spool 114 to the forward or pressure set position shown. The valve bore 116 is in fluid communication with the forward passage 108, the reverse passage 104, a forward apply passage 124, a reverse apply passage 126, a fourth apply passage 128, and two exhaust passages 130 and 132. In the forward or pressure set position shown, the forward passage 108 is in fluid communication with the forward apply passage 124 between lands $c$ and $b$, the reverse apply passage 126 is in fluid communication with the fourth apply passage 128 between lands $a$ and $b$, the exhaust passage 130 is blocked by land $c$, and the reverse passage 104 is blocked by land $b$. In the reverse or spring set position, of the valve 18, the reverse passage 104 is in fluid communication with the reverse apply passage 126 between lands $a$ and $b$, the forward apply passage 124 is exhausted at passage 130 between lands $b$ and $c$, the fourth apply passage 128 is blocked by land $a$ and the forward passage 108 is blocked by land $b$. The forward apply passage 124 and reverse apply passage 126 are both in fluid communication with conventional fluid operated friction drive establishing devices, not shown.

The first relay valve 84 includes a valve spool 134 having equal diameter spaced lands $a$ and $b$ slidably disposed in a valve bore 136, a spring 138 compressed between valve land $a$ and one end of valve bore 136, and three equal diameter plug valves 140, 142, and 144 slidably disposed in valve bore 136. The relay valve 84 is movable to a spring set position wherein drive passage 78 is in fluid communication between lands $a$ and $b$ with a first feed passage 146. The first relay valve 84 can be moved to a pressure set position, as shown, by the introduction of fluid pressure between plug 140 and valve land $b$, or between plugs 140 and 142, or between plugs 142 and 144, or between plug 144 and the end of valve bore 136. The space between land $b$ and plug 140 is in fluid communication with a 2-1 control passage 148, the space between plugs 140 and 142 is in fluid communication with a third feed passage 150, the space between plugs 142 and 144 is in fluid communication with a fourth feed passage 152, and the space between plug 144 and the end of valve bore 136 is in fluid communication with a second apply passage 154. When the relay valve 84 is in the pressure set position, the first feed passage 146 is exhausted and the drive passage 78 is closed from fluid communication with the first feed passage 146 by valve land $b$.

The second relay valve 86 includes a valve spool 156, having equal diameter spaced lands 158 and 160 slidably disposed in a valve bore 162, and a compression spring 164 compressed between one end of valve bore 162 and the valve land 158. Also slidably disposed in the valve bore 162 are four plug valves 166, 168, 170, and 172. The valve bore 162 is in fluid communication with the drive passage 78, a second feed passage 174, a first apply passage 176, a 3-2 control passage 178, the fourth feed passage 152, the neutral passage 74, a third apply passage 180, and two exhaust passages. In the spring set position shown, fluid pressure in the drive passage 78 is communicated between lands 158 and 160 to the second feed passage 174. In the pressure set position of valve spool 156, the second feed passage 174 is exhausted between lands 158 and 160 while land 160 blocks fluid communication between passages 78 and valve bore 162. The pressure set position can be established by pressurizing passage 176 which is in fluid communication with valve bore 162 between lands 160 and plug valve 166, or by pressurizing passage 178 which pressure acts between plug valves 166 and 168, or by pressurizing passage 152 which pressure acts between plug valves 168 and 170, or by pressurizing passage 74 which pressure acts between plug valves 170 and 172, or by pressurizing passage 180 which pressure acts between plug valves 172 and the end of valve bore 162. The third relay valve 88 and the fourth relay valve 90 are similar in construction to the second relay valve 86 such that the corresponding parts are given the same numerical designation with an $a$ suffix for valve 88 and a $b$ suffix for valve 90. The valve bore 162$a$ of the third relay valve 88 is in fluid communication with the third feed passage 150, the drive passage 78, the first feed passage 146, a 2-3 control passage 182, the fourth apply passage 128, the neutral passage 74, and the second apply passage 154. The valve 88 is functional in a spring set or pressure seat position similar to that described above for valve 86. In the spring set position, fluid pressure in drive passage 78 is in fluid communication with the third feed passage 150, and in the pressure set position shown, the third feed passage 150 is exhausted. The valve bore 162$b$ of the fourth relay valve 90 is in fluid communication with the fourth feed passage 152, the drive passage 78, the first feed passage 146, the second feed passage 174, a 3-4 control passage 184, the neutral passage 74, and a third apply passage 180. The fourth relay valve 90 is also movable to a spring set position and a pressure set position to control fluid pressure in the fourth feed passage 152.

The first shift valve 52 includes a valve spool 186 having spaced equal diameter lands 188 and 190 and a smaller diameter land 192 slidably disposed in a stepped valve bore 194, and a spring 196 compressed between one end of valve bore 194 and valve land 188. The small diameter land 192 cooperates with the valve bore 194 to provide a shift control chamber 198 which is in fluid communication through a restriction 200 with the solenoid passage 42. The pressure in chamber 198 is controlled by energizing a variable force solenoid which may be constructed in accordance with U.S. Pat. No. 3,225,619 issued to R. H. Schaefer Dec. 28, 1965. The variable force solenoid F functions such that as the current applied to the solenoid increases the output force of the solenoid valve increases to progressively close an exhaust passage thereby increasing the resistance to fluid exhaust and an increase pressure in the chamber 198. The restriction 200 limits the flow of fluid to the chamber 198 when the solenoid F is fully opened to prevent excessive fluid flow losses. As the solenoid F is modulated toward a closed position, the fluid pressure in chamber 198 acting on valve 192 causes the valve spool 186 to move in the valve bore 194 against the force in spring 196. The valve bore 194 is in fluid communication with the first feed passage 146, the first apply passage 176, the second feed passage 174, the 2-1 control passage 148, and three exhaust passages. The valve spool 186 can be moved to a pressure controlled position by modulating the solenoid F such that valve land 192 blocks the first feed passage 146, provides a controlled exhaust connection between the first apply passage 176 and an exhaust passage, between lands 190 and 192. Also in the pressure controlled position, the valve land 190 blocks the second feed passage 174 while land 188 opens an exhaust connection for the 2-1 control passage 148 between lands 190 and 188. The first apply passage is in fluid communication with a conventional fluid operated drive establishing device such as a brake.

Assuming the first relay valve 84 is in the spring set position, such that fluid pressure is available from the drive passage 78 to the first feed passage 146 and the first shift valve 52 is in a pressure control position such that valve land 192 is blocking the first feed passage 146, a decrease in the current to solenoid F will permit the spring 196 to move the valve spool 186 in the valve bore 194 until there is fluid pressure in passage 146 acting on the differential area between lands 190 and 192. The level of pressure acting on this differential area is determined by the fluid pressure in control chamber 198 and the force in spring 196. This level of fluid pressure also acts on the friction drive establishing device to provide a controlled engagement pressure therefore. As the current in solenoid F is decreased, the pressure in the first apply passage 176 will increase until the total pressure forces acting on valve land 192 in chamber 198, and the differential area between lands 190 and 192 is not sufficient to overcome the force in spring 196. At this time, the pressure in the first apply passage 176 will be at a maximum value and the friction drive establishing device will be fully applied.

The second, third, and fourth shaft valves 54, 56, and 58 are similar in construction to the first shift valve 52 such that corresponding parts are given the same numerical designation with a, b, and c suffixes for the second, third, and fourth shift valves respectively. The second, third, and fourth shift valves function in a manner similar to that described above for the first shift valve 52. The second shift valve 54 controls the engagement pressure in the second apply passage 154 F or a second ratio fluid operated friction drive establishing device such as a brake. The third shift valve 56 controls fluid pressure in the third apply pressure 180 for the engagement of a third ratio fluid operated friction drive establishing device, such as a brake. The fourth shift valve 58 controls the pressure in fourth apply passage 128 and passage 126 to control the engagement of a fourth and reverse fluid operated friction drive establishing device such as a clutch.

The control system described herein, may be used with a 4-speed planetary gearing arrangement such as that shown in U.S. Pat. No. 3,730,022 issued on May 1, 1973, to J. J. O'Malley and assigned to the assignee of this application. The solenoids A and B, shown in FIG. 2a, can be controlled in a conventional manner to provide a neutral or drive condition in the transmission control. The solenoids C, D, and E can be controlled in a conventional manner to provide a forward or reverse drive condition in the transmission control. In the neutral condition the solenoids A, D, and E are energized thereby exhausting the chambers 68, 98, and 120 respectively. Thus, in neutral, valve 14 is in the spring set position, valve 16 is in the pressure set position, and valve 18 is in the spring set position. In the neutral condition, the passage 78 is exhausted at the neutral valve 14 while the neutral passage 74 is pressurized from passage 24 through the neutral valve 14. Fluid pressure in the neutral passage 74 is communicated to the fourth relay valve 90 between plugs 170b and 172b, the third relay valve 88 between plugs 170a and 172a, and the second relay valve 186 between plugs 170 and 172. Thus the second relay valve 86, the third relay valve 88, and the fourth relay valve 90 are moved to their pressure set position in the neutral condition; while the first relay valve 84 is maintained in its spring set position. However, since drive passage 78 is exhausted, the first ratio drive establishing device cannot be engaged. To condition the transmission for forward drive, the solenoids A and E are deenergized while the solenoid B is energized. This causes the valve 14, 16, and 18 to move the pressure set positions shown whereby neutral passage 74 is exhausted and drive passage 78 is pressurized. Pressurization of drive passage 78 causes engagement of the forward clutch through passages 108 and 124, and engagement of the first drive establishing device through passages 146 and 176. The second, third, and fourth relay valves are momentarily held in their pressure set position by controlling the exhausting of pressure in the neutral passage through a restriction 202. When the fluid pressure in the first apply passage 176 reaches a predetermined level, for example, 75 psi, the second relay valve 86 is held in the pressure set position by this fluid pressure acting between valve land 160 and plug valve 166. At the same time, fluid pressure in the first feed passage 146 acts on the third relay valve 88 and the fourth relay valve 90 to maintain these valves in the pressure set position.

The energization of solenoids F, G, H, and J can be controlled manually or by an automatic control system responsive to vehicle performance parameters such as engine torque and vehicle speed to cause ratio changing in the transmission. When a ratio change from first to second is desired, the solenoids F and G are both energized and modulated, to maintain a predetermined pressure. i.e., 50 psi, in the control chamber 198 and 198a, such that the first shift valve controls exhausting of the first apply passage 176 and the second shift valve 54 is moved to a pressure controlled position. As the pressure in the first apply passage 176 decreases, below a predetermined value, the second relay valve will move to its spring seat position, thereby providing a fluid connection between drive passage 78 and the second feed passage 174. The solenoids F and G are then modulated to provide decrease in and pressure in their respectively control chambers such that the fluid pressure in passage 174 is directed through passaage 154 and to the 2-1 control passage 148 between lands 188 and 190 of the first ratio shift valve 52 when the shift is completed. When the fluid pressure in passage 154 is sufficient to overcome the force in spring 138, the first relay valve 84 will be moved to the pressure set position, thereby exhausting passage 146. The fourth relay valve 90 at this time, is maintained in the pressure set position by fluid pressure in passage 174. After the shift, pressure in passage 148 is available to provide latching pressure also. The third relay valve is maintained in the pressure set position by fluid pressure in the 2-3 control passage 182. Fluid pressure in the second apply passage 154 is also directed to the first relay valve 84 and the third relay valve 88. By selective modulation of solenoids G and H, a second to third ratio change is accomplished, and by selective modulation of solenoids H and J a third to fourth ratio change is provided.

Figure 2B:
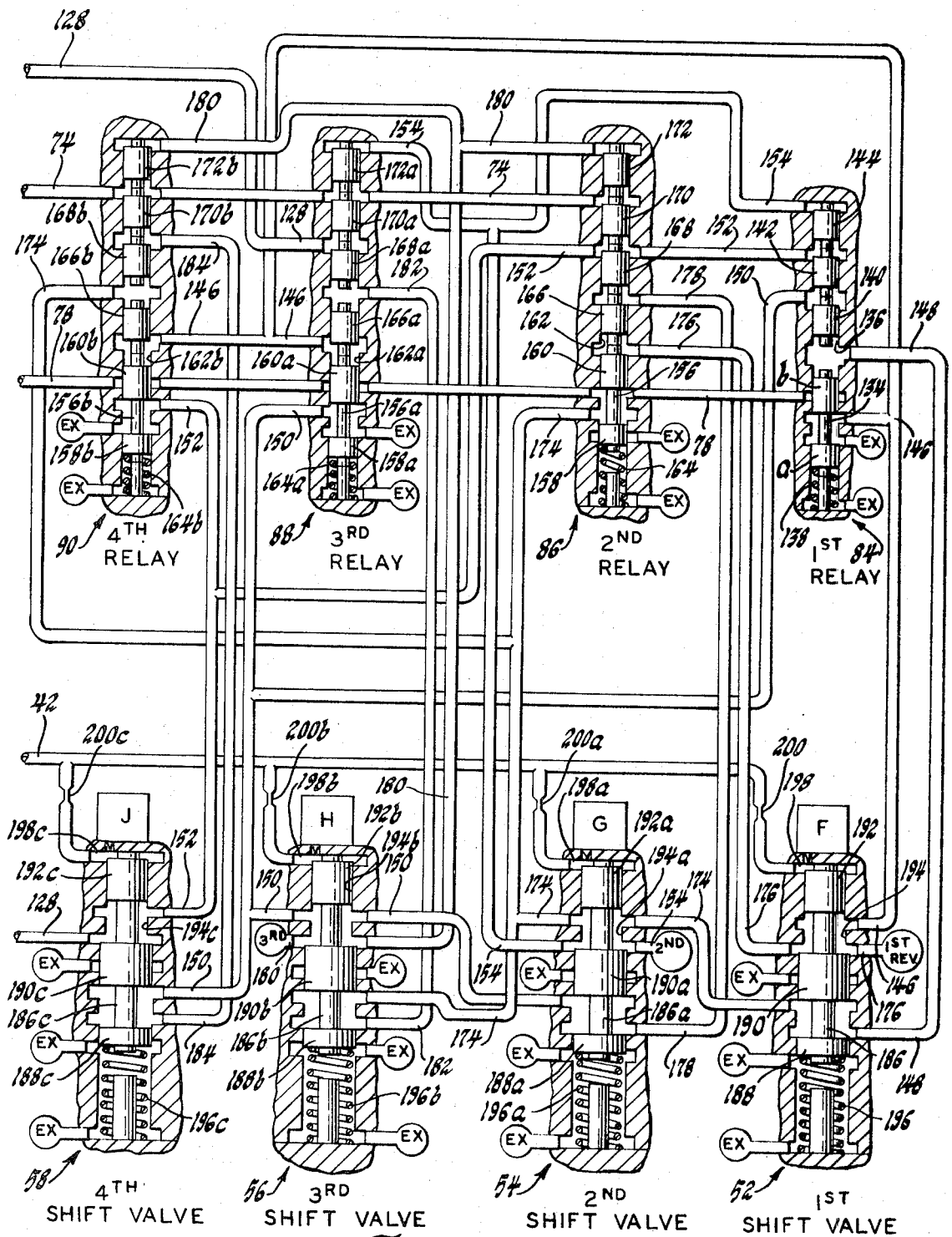
FIG. 2b is a diagrammatic representation of the remainder of the control system.

The valving of the control system as shown in FIGS. 2a and 2b is positioned to establish the second drive ratio in the transmission. Assuming that a second to third ratio change is requested, but for some reason the second shift valve 54 does not respond to the request, either due to a malfunction in the solenoid G or sticking of the valve spool 186a, the transmission will remain in the second ratio. When the upshift is requested at solenoid H, third shift valve 56 will function normally. However, fluid pressure in passage 154, which remains in fluid communication with passage 174, will prevent unlatching of the first relay valve 84 and third relay valve 88 such that the upshift cannot occur. The same holds true if a second to first downshift was requested, and the second shift valve 54 does not respond to the request. If a second to third upshift is requested and the third shift valve 56 does not respond to the request, the second shift valve 54 will function normally. The valve spool 186a will be moved to a pressure controlled position by fluid pressure in chamber 198a. However, fluid pressure in passage 174 will remain in fluid communication with the 2-3 control passage 182 to maintain the third relay valve 88 in the latched position so that the third feed passage 150 can not be pressurized and the shift cannot be obtained. When the second shift valve 54 returns to the spring set position, the second ratio will be reestablished.

If a second to first downshift is requested, and the first shift valve 52 does not respond to the request, fluid pressure in passage 174 will be maintained in fluid communication with the 2-1 control passage 148 to maintain the first relay valve 84 in the latched position, thus preventing the engagement of the first ratio drive establishing device. Again, the second shift valve 54 will proceed through a shift sequence and return to the spring set position to reestablish the second ratio.

If the transmission is conditioned for the third ratio, and an upshift to fourth or a downshift to second is requested, but the third shift valve 56 does not respond to the request, the shift cannot be completed since fluid pressure in the third apply passage 180 will maintain the second relay 86 and the fourth relay valve 90 in the latched or pressure set positions. If the fourth shift valve 58 does not respond to a shift request, the fluid pressure in the third feed passage 150 will be maintained in fluid communication with the 3-4 control passage 184 thus preventing unlatching of the fourth relay valve 90. If the second shift valve 54 does not respond to the shift request, fluid pressure in the third feed passage 150 will be maintained in fluid communication with the 3-2 control passage 178 to maintain the second relay valve 86 in the latched or pressure set position thus preventing completion of the ratio change. Under the last two conditions mentioned above, the third shift valve 56 would function normally such that the third ratio device would be exhausted, however, the third ratio device would be repressurized for engagement when the shift valve 56 returns to the spring set position.

If the transmission is conditioned for the fourth drive ratio, and a 4-3 downshift is requested, and the fourth shift valve 58 does not respond properly to the request, the third ratio shift valve 56 will be operated through its normal cycle, however, the third relay valve will not be unlatched since the fourth apply line 128 will remain pressurized. If the same downshift is requested and the third shift 56 does not respond to the request the fourth shift valve 58 will operate normally providing for exhausting of the fourth ratio drive establishing device. As the fourth ratio drive establishing device is exhausted, the fourth apply line 128 will be exhausted thereby permitting the third relay valve 88 to be moved to the spring set position. In the spring set position of the third relay valve, the third ratio drive establishing device will be engaged by unmodulated fluid pressure in passages 150 and 180 and the fourth relay valve will be latched by pressure in passage 180. As the fourth shift valve 58 returns toward the spring set position, upon completion of the shift, fluid pressure in passage 150 will be communicated with the 3-4 control passage 184 which will also provide pressure to the fourth relay valve 90 to move that valve to the pressure set position. At this time, the transmission will be conditioned for operations in third gear, and since the third shift valve 56 is not functioning properly, the transmission will remain in the third ratio until the control system is conditioned for neutral.

If a first to second upshift is requested, and the first shift valve 52 does not function properly, the transmission will remain in the first ratio since fluid pressure in the first apply passage 176 will prevent unlatching of the second relay valve 86. If the same upshift is requested and the second shift valve 54 does not respond to the request, the first shift valve 52 will respond as requested to exhaust the first ratio drive establishing devices by exhausting the first apply passage 176 which will permit the second relay valve 86 to move to the spring set position to direct fluid pressure through passages 174 and 154 to the second ratio drive establishing device and first relay valve latching system. As the first ratio shift valve completes its shift function, fluid pressure in passage 174 will be communicated with the 2-1 control passage 148 to maintain the first relay valve 84 in the pressure set position. The transmission will remain in the second ratio, as long as the second ratio shift valve 54 continues to be unresponsive to upshift and downshift requests.

The transmission is conditioned for reverse operation by energizing solenoids B, C, and E which will result in the neutral valve 14 being established in the pressure set position shown, the forward-reverse shift valve 16 and the forward-reverse control valve 18 will be moved to the spring set position. Fluid pressure in drive passage 78 at this time, is directed through the first relay valve 84, to the first feed passage 46 so that the first ratio drive establishing device is engaged. The second, third, and fourth relay valves will have been held in the pressure set positions by fluid pressure in the neutral passage 74, and when fluid pressure is admitted to passage 146, the third and fourth relay valves will be maintained in the pressure set positions, while the second relay valve 86 will be maintained in the pressure set position by fluid pressure in the first apply passage 176. The fourth-reverse drive establishing device will be pressurized by fluid pressure directed from passage 78 to passage 104 through the forward-reverse shift valve 16 and then from passage 104 to passage 126 through the forward-reverse control valve 18.

From the above description, it is seen that the transmission, when operating in the forward drive ratios, will maintain a drive ratio engaged if the shift valves do not function properly. If the transmission is in an intermediate ratio, such as second or third, an upshift or downshift will not occur when either the oncoming or offgoing shift valve does not function properly.

Obviously, many modifications and variations of the present invention are possible in light of the above teachings. It is, therefore, to be understood that within the scope of the appended claims the invention may be practiced otherwise than as specifically described.

What is claimed is:

1. A control for a multi-speed planetary gear transmission having a plurality of fluid operated selectively engageable drive establishing means for establishing drive ratios in the planetary gearing, said control comprising; pump means for providing a source of fluid pressure; first, second, and third relay valve means in fluid communication with said pump means and each being moveable to a spring set position and a pressure set position for controlling fluid from said pump means; first, second and third shift valve means each being moveable to a spring set position and a pressure controlled position for controlling the engagement of first, second, and third of said drive establishing means respectively; first fluid passage means in fluid communication with said second relay valve means and said first, second, and third shift valve means for providing pressurized fluid from said pump means through said second relay valve means when said second relay valve means is in the spring set position and providing an exhaust connection when said second relay valve means is in the pressure set position; second fluid passage means in fluid communication with said second shift valve means, said first and third relay valve means and the second drive establishing means for directing pressurized fluid in said first passage means to said first and third relay valve means to control movement thereof to said pressure set position, and to the second drive establishing means for controlling engagement thereof when said second shift valve means is in the spring set position and for permitting exhausting of the pressurized fluid therein to control movement of said first and third relay valve means to the spring set position and the engagement pressure of the second drive establishing means when said second shift valve is in said pressure controlled position; third passage means in fluid communication with said first shift valve means and said first relay valve means and being in fluid communication with said first passage means when said first shift valve means is in said spring set position and to exhaust when said first shift valve means is in said pressure controlled position for directing fluid pressure to and from said first relay valve means to control movement thereof between the spring set and pressure set positions thereof; and fourth passage means in fluid communication with said third shift valve means and said third relay valve means and being in fluid communication with said first passage means when said third shift valve means is in the spring set position and to exhaust when said third shift valve means is in said pressure controlled position for directing fluid pressure to and from said third relay valve means to control movement thereof between the spring set and pressure set positions thereof.

2. A control for a multi-speed planetary gearing transmission having a plurality of fluid operated selectively engageable drive establishing means for establishing low, intermediate, and high drive ratios in the planetary gearing, said control comprising; pump means for providing a source of fluid pressure; low, intermediate, and high shift valve means each being selectively operable between a spring set and pressure controlled position, for establishing said low, intermediate, and high drive ratios, being moveable to the pressure controlled position for ratio interchange and returning to the spring set position on ratio establishment; relay valve means for each of said low, intermediate, and high shift valve means and each being selectively operable to a spring set position for delivering fluid pressure between said pump means and said shift valve means and a pressure set position for exhausting pressure at said shift valve means; and passage means interconnecting said pump means, said relay valve means, said shift valve means and said drive establishing means for maintaining the intermediate drive ratio established and maintaining the relay valve means for the low and high shift valve means in the pressure set position when the high or intermediate or low shift valve means do not function properly by moving to the pressure controlled position on an upshift from intermediate to high or on a downshift from intermediate to low.

3. A control for a multi-speed planetary gear transmission having a plurality of fluid operated selectively engageable drive establishing means for establishing drive ratios in the planetary gearing, said control comprising; pump means for providing a source of fluid pressure; first, second, third, and fourth relay valve means in fluid communication with said pump means and each being moveable to a spring set position and a pressure set position for controlling fluid from said pump means; first, second, third, and fourth shift valve means each being moveable to a spring set position and a pressure controlled position for controlling the engagement of first, second, third, and fourth of said drive establishing means respectively; first fluid passage means in fluid communication with said second relay valve means, said first, second and third shift valve means and said fourth relay valve means for providing pressurized fluid from said pump means through said second relay valve means when said second relay valve means is in the spring set position and providing an exhaust connection when said second relay valve means is in the pressure set position and for moving said fourth relay valve means to said pressure set position;

second fluid passage means in fluid communication with said second shift valve means, said first and third relay valve means and the second drive establishing means for directing pressurized fluid in said first passage means to said first and third relay valve means to control movement thereof to said pressure set position, and to the second drive establishing means for controlling engagement thereof when said second shift valve means and second relay valve means are in the spring set position and for permitting exhausting of the pressurized fluid therein to control movement of said first and third relay valve means to the spring set position and for controlling the engagement pressure of the second drive establishing means when said second shift valve is in said pressure controlled position; third passage means in fluid communication with said first shift valve means and said first relay valve means and being in fluid communication with said first passage means when said first shift valve means is in said spring set position and to exhaust when said first shift valve means is in said pressure controlled position for directing fluid pressure to and from said first relay valve means to control movement thereof between the spring set and pressure set positions thereof; fourth passage means in fluid communication with said third shift valve means and said third relay valve means and being in fluid communication with said first passage means when said third shift valve means is in the spring set position and to exhaust when said third shift valve means is in said pressure controlled position for directing fluid pressure to and from said third relay valve means to control movement thereof between the spring set and pressure set positions thereof; said first and second passage means remaining pressurized to prevent a ratio change from second to first and from second to third when said second shift valve means is in said spring set position; said first and third passage means remaining pressurized to prevent a ratio change from second to first when said second shift valve means is in said pressure controlled position and said first shift valve means is in said spring set position; said first and fourth passage means remaining pressurized to prevent a ratio change from second to third when said second shift valve means is in said pressure controlled position and said third shift valve means is in said spring set position; fifth passage means in fluid communication with said third relay valve means, said second, third, and fourth shift valve means and said first relay valve means for providing pressurized fluid from said pump means through said third relay valve means when said third relay valve means is in said spring set position and for providing an exhaust connection when said third relay valve means is in the pressure set position, and for moving said first relay valve means to said pressure set position when said third relay valve means is in said spring set position; sixth passage means for providing fluid communication between said third shift valve means and said third drive establishing means to establish engagement thereof, said second relay valve means and said fourth relay valve means; seventh passage means for providing fluid communication between said second shift valve means and said second relay valve means; and eighth passage means for providing fluid communication between said fourth shift valve means and said fourth relay valve means; said fifth and sixth passage means remaining pressurized to prevent a ratio change from third to second and from third to fourth when said third relay valve means and said third shift valve means are in said spring set positions; said fifth and seventh passage means remaining pressurized to prevent a ratio change from third to second when said third relay valve means and said second shift valve means are in said spring set positions and said third shift valve means is in said pressure controlled position; said fifth and eighth passage means remaining pressurized to prevent a ratio change from third to fourth when said third relay valve means and said fourth shift valve means are in said spring positions and said third shift valve means is in said pressure controlled position.

4. A control for a multi-speed planetary gearing transmission having a plurality of fluid operated selectively engageable drive establishing means for establishing low, intermediate, and high drive ratios in the planetary gearing, said control comprising; pump means for providing a source of fluid pressure; low, intermediate, and high shift valve means each being selectively operable between a spring set and pressure controlled position, for establishing said low, intermediate, and high drive ratios and being moveable to the pressure controlled position for ratio interchange and returning to the spring set position on ratio establishment; relay valve means for each of said low, intermediate, and high shift valve means and each being selectively operable to a spring set position for delivering fluid pressure between said pump means and said shift valve means and a pressure set position for exhausting pressure at said shift valve means; and passage means interconnecting said pump means, said relay valve means, said shift valve means and said drive establishing means for maintaining the intermediate drive ratio established and maintaining the relay valve means for the low and high shift valve means in the pressure set position when the intermediate or high shift valve means do not move to the pressure controlled position during a requested upshift from intermediate to high or the intermedite or low shift means do not move the pressure controlled position during a requested downshift from intermediate to low, for maintaining the low drive ratio established and maintaining the relay valve means for the intermediate and high shift valve means in the pressure set position when the low shift valve means does not move to the pressure controlled position during a requested upshift from low to intermediate, and for maintaining the high drive ratio established and maintaining the relay valve means for the intermediate and low shift valve means in the pressure controlled position when the high shift means does not move to the pressure controlled position during a requested downshift from high to intermediate.

* * * * *